Oct. 30, 1962 G. FÖRSTER 3,061,787

CIRCUIT ARRANGEMENT TO DERIVE A CONTROL-VOLTAGE

Filed Dec. 4, 1958

INVENTOR
GERHARD FÖRSTER

BY
Frank R. Trifari
AGENT

United States Patent Office 3,061,787

Patented Oct. 30, 1962

3,061,787

CIRCUIT ARRANGEMENT TO DERIVE A CONTROL-VOLTAGE

Gerhard Förster, Hamburg-Stellingen, Germany, assignor to North American Philips Company, Inc., New York, N.Y., a corporation of Delaware Filed Dec. 4, 1958, Ser. No. 778,176
Claims priority, application Germany Dec. 20, 1957
2 Claims. (Cl. 328—92)

Figure 1:
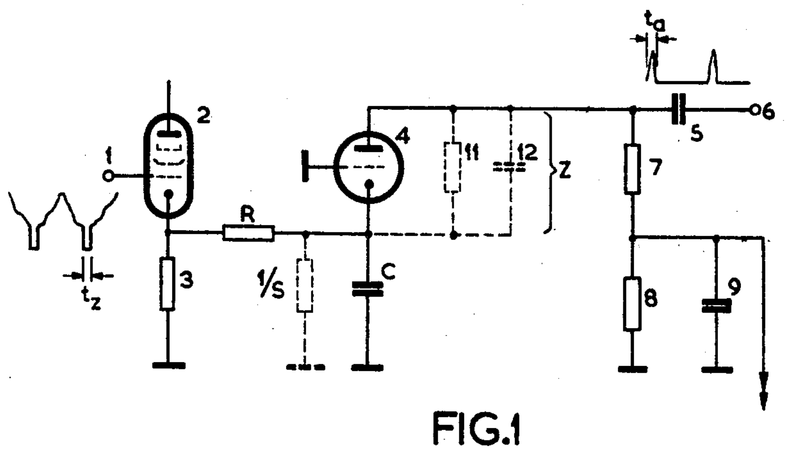

The invention relates to a circuit arrangement to derive a control-voltage which corresponds approximately to the peak value of comparison pulses, in which arrangement the comparison pulses, derived from the load resistor of a pre-amplifier, on the one hand, and gate pulses, on the other hand, are fed to an amplifier, for example a triode, in such a manner that the amplifier is conductive only at the simultaneous occurrence of a comparison pulse and a gate pulse.

Such an arrangement is particularly employed in television receivers, where the line synchronising pulses of the transmitted signal serve as comparison pulses, of which the peak value is a measure for the signal strength.

The gate pulses may be, for example, the fly-back pulses of the line deflection transformer. The control-valve becomes conductive under the influence of these gate pulses only at the instants when, at the same time, the line pulses occur, so that an extremely interference-free control-voltage is obtained, which affects the amplification of at least one preliminary valve. This involves also an important amplification of the control-voltage, whilst by using the gate pulses as a supply voltage for the amplifier the difficulties involved in direct-voltage amplifiers owing to the required direct-current couplings are avoided.

Experiments leading to the invention have proved that the gate pulses are also transmitted to a certain extent to the input of the amplifier. When this input is connected in a conventional manner directly to the load resistor, for example, the cathode- or anode-resistor of a pre-amplifier, the gate pulses also occur at the output of this pre-amplifier which may give rise to considerable interferences particularly when the output of this pre-amplifier feeds, in addition, further stages, for example, when it serves as a video-amplifying stage, or when it controls the deflection device. These disadvantages are largely mitigated, if in accordance with the invention, between the load resistor of the pre-amplifier and the input of the control-voltage amplifier provision is made of a voltage-divider, of which the longitudinal impedance for alternating voltages of which the period is at the most equal to double the width of the comparison pulses is high with respect to the load resistor and of which the transverse impedance has approximately the same value as the longitudinal impedance. It should be noted that it is already known to provide, between the anode of a video amplifying valve and the grid of a gated control-voltage amplifying valve, a high preliminary resistor, whilst the peaks of the positive-going synchronizing pulses at this grid are to be kept at about zero volt. It is thus achieved that by the grid current the interference peaks superimposed on the synchronizing pulses are cut off, so that the pulses free of interference can be fed from the grid of this control-voltage amplifying valve to the synchronizing circuit.

This would involve, however, a high leakage resistor as compared with the preliminary resistance between the grid and the cathode of the amplifying valve, so that a voltage reduction of the gate pulses transmitted from the ouput of the amplifier to the pre-amplifier is not obtained.

The invention will be described, by way of example, with reference to the accompanying drawing.

FIG. 1 shows a circuit arrangement of the aforesaid kind, in which at the input terminal 1 a television signal with negative-going synchronizing pulses is fed to the grid of a pre-amplifying valve 2. This valve may serve as a video amplifier or as a pulse-separator or as a pulse-amplifier, of which the anode circuit is connected in the conventional manner to a load or the like.

The cathode branch of the valve 2 includes a resistor 3 of, for example, 100 ohms, at which occurs the input signal with approximately the same amplitude.

With known arrangements the signal is supplied directly from the cathode of the valve 2 to the cathode of a control-voltage amplifier 4, of which the grid is connected to earth and the anode is fed by way of a capacitor 5 by gate pulses from the terminal 6, of which pulses the peak voltage may be, for example, 200 v. These gate pulses occur approximately simultaneously with the synchronizing pulses of the incoming signal. Then valve 4 becomes conductive and the resistors 7 and 8, connected between anode and earth, are traversed by a compensating current, owing to which the junction of the two resistors gets negative potential, which is smoothed by means of the capacitor 9. The control-voltage thus obtained has the greater negative values the more negative are the synchronizing pulses of the input signal owing to a larger amplitude.

Therefore, the control-voltage, indicated by a double arrow, can be fed in a conventional manner to at least one of the preliminary stages for the adjustment of the amplification.

As stated above, it has been found that the gate pulses may reach, by way of the internal resistance of the valve 4, the load resistor 3 of the preliminary valve 2. This may result in interferences in the pre-amplifier 2 and at the output thereof, for example, at its anode circuit; however, as an alternative the production of the control voltage may be affected so that even with a low input signal a control-voltage is obtained, which reduces the amplification of the controlled preliminary valves(s), so that no adequate signal, for example, for television reproduction, is obtained. The internal resistance of the valve 4 may be represented by the parallel combination of an ohmic resistor of, for example, 50 to 700 K ohm (in dependence of the voltage at its input electrode) and of the anode-grid capacity of, for example, 0.2 pf., which constitute together an essentially ohmic impedance Z of at least about 50 K ohm.

In accordance with the invention the load resistor 3 of the pre-amplifier and the input at the cathode of the amplifying valve 4 have connected between them an ohmic longitudinal resistor R of, for example, 3 K ohm and a transverse capacity C of, for example, 600 pf. with respect to earth. The ohmic resistor R is high with respect to the value $R_3$ of the load resistor 3.

To the voltage division $V_u$ from the anode of valve 4 to the cathode of valve 2 then applies:

$$V_u = \frac{Z}{\dfrac{R\cdot\dfrac{1}{j\omega c}}{R+\dfrac{1}{j\omega c}}}\cdot\frac{R}{R_3} = \frac{Z}{R_3}\sqrt{1+(\omega CR)^2} \qquad (1)$$

In the denominator of the first fraction figurates the impedance obtained by the parallel combination of R (leaving $R_3$ out of consideration) and C; (the fraction indicates the current conveyance in the two parallel branches with R and C respectively); the second fraction relates to the voltage division between the cathode of the control-voltage valve 4 and the cathode of the pre-amplifier 2. With the further calculation it is taken into account that essentially the absolute amount is important for the approximation.

With respect to the circuit frequency it may be assumed that the pulses can be represented, in principle, as sinusoidal semi-waves. Their periodicity corresponds approximately to double the duration $t_a$ of the gate pulses, so that it can be written:

$$V_u = \frac{Z}{R_3}\sqrt{1+\left(\frac{\pi}{t_a}CR\right)^2} \qquad (2)$$

The amplitude of the higher harmonics occurring with a pulse wave at more acute angles or shortened by differentiation is strongly reduced by the capacitor C, so that these harmonics may be left out of consideration. Apart from the aforesaid interference transmission of the gate pulses to the cathode of the valve 2, also the desired transmission of the comparison pulses (synchronising pulses) from the cathode of valve 2 to the cathode of valve 4 is to be taken into account. The transmission takes place mainly without interference, when the time constant of the RC-member between the said cathodes is of the order of the duration $t_z$ of the comparison pulses, and is preferably small with respect thereto. This is expressed by the following equation:

$$CR = b.t_z;\ b=1 \text{ or } b<1 \qquad (3)$$

By combining Formulae 2 and 3 we obtain:

$$V_u = \frac{Z}{R_3}\sqrt{1+\left(\pi.b\frac{t_z}{t_a}\right)^2} \qquad (4)$$

Since the ratio $Z/R_3$ represents the voltage division obtained without the RC-member, it is found that a marked improvement is obtained, when $$b\frac{t_z}{t_a} > 0.3 \qquad (5)$$

If $t_z = t_a$, $b$ must exceed the value indicated. Particularly if $b$ attains the value 1 and exceeds this value, as the case may be, a certain deformation of the comparison pulse occurs during the transmission. Since, moreover, the amplitude of the transmitted pulse is in direct relationship with the amplitude of the comparison pulse, this may be acceptable, if necessary, since an improvement is involved as far as any simultaneous narrow interference pulses are drastically attenuated.

A mainly theoretically unlimited improvement may be ensured, by reducing the duration $t_a$ of the gate pulses, for example, but cutting off the narrower pulse peak in a threshold device or by differentiation.

It is advantageous to have the gate pulses shorter than half, preferably shorter than one-fifth the duration of the comparison pulses.

A further improvement may be obtained by using a valve 4 with a steep slope, of for example more than 10 ma./v., since with the grid-base connection employed, during the opening time of the valve, a resistance of the value $1/S$ is operative between cathode and earth. Thus, during the said period a considerably greater voltage division from the anode to the cathode of the gate-pulse valve 4 is obtained, whereas a considerable voltage variation of the capacitor C charged by the comparison pulse does not occur, at any rate not when the short gate pulses coincide with the last half or the last third part of the period of the comparison pulse. The same applies, for example, also to transistor arrangements, of which the input resistance also varies strongly at switching-on of the supply voltage.

With the calculations given above it is assumed that the impedance Z is high with respect to the impedance of the valve 4 connected between cathode and earth. This condition is always fulfilled, since otherwise the gate pulses cannot be kept clear of the cathode of the pre-amplifier.

Figure 2:
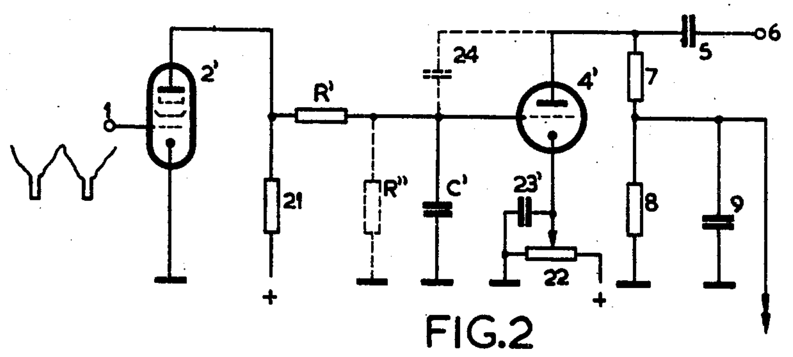

FIG. 2 shows a similar arrangement with a grid-controlled gate-pulse valve 4'.

As shown in FIG. 2, the image signals with negative-going synchronizing pulses are fed from a terminal 1 to the grid of a pre-amplifier 2', of which the cathode is connected to earth and the anode is connected by way of a load resistor 21 to the positive terminal of a supply source of, for example, 200 v. Via a longitudinal resistor R' and a transverse capacity C' the comparison pulses are fed to the grid of the valve 4'. In order to obtain the correct adjustment of the working point and, if necessary, a threshold value for the production of the control-voltage, the cathode of the valve 4' is connected to the tapping of a potentiometer 22, connected to the supply source, and via a capacitor 23 connected to earth for alternating voltages. By way of a separation capacitor 5 the gate pulses are fed from the terminal 6 to the anode of the valve 4', whilst, as in the arrangement shown in FIG. 1, the control-voltage is obtained from a voltage-divider 7, 8 and the smoothing capacitor 9.

Also with this method of control a reverse transmission of the gate pulses to the load resistor 21 of the pre-amplifier 2' occurs, by way of the anode-grid capacitor 24. The impedance thereof can therefore be represented by Z in the equations given above. Otherwise with respect to the design of the decoupling member R'C' according to the invention, the same rules apply as those indicated with reference to FIG. 1. In Equation 2 Z is then replaced by the impedance of the grid-anode capacitor 24 and $R_3$ by $R_{21}$ (the value of the load resistor 21). Accordingly, in Equation 3 the product of the resistor R' and the capacitor C' is to be introduced into the left-hand section.

If, particularly with the arrangement shown in FIG. 2, the available control-voltage is unnecessarily high, it may be reduced by including in the transverse impedance not only the capacitor C' but also a parallel resistor R''; thus, at the same time, a corresponding improvement is obtained in the reverse transmission of the gate pulses.

What is claimed is:

1. A television receiver circuit for generating an automatic gain control voltage, comprising a source of a television signal having negative going synchronization pulses, first and second electronic amplifier devices each having a cathode, a control grid, and an anode, means applying said signal to the control grid of said first device, load resistance means connected between the cathode of said first device and a reference potential, a source of positive going periodic pulses, means applying said positive going pulses to the anode of said second device, resistance means connecting the cathodes of said first and second devices, and capacitance means connected between the cathode of said second device and said reference potential, the resistance of said resistance means being high with respect to the resistance of said load resistor, the time constant of said resistance and capacitance means being of the order of the duration of said synchronization pulses.

2. The circuit of claim 1 in which the time constant of said resistance and capacitance means is equal to $bt_z$, where $b$ is a constant having a value less than 1, and $t_z$ is the duration of said synchronization pulses.

References Cited in the file of this patent

UNITED STATES PATENTS

| | | |
|---|---|---|
| 2,003,992 | Cockrell | June 4, 1935 |
| 2,819,353 | Keizer et al. | Jan. 17, 1958 |
| 2,854,571 | Janssen | Sept. 30, 1958 |